United States Patent
Panni et al.

(10) Patent No.: US 12,123,397 B2
(45) Date of Patent: Oct. 22, 2024

(54) DYNAMIC CONTROL OF REACTIVE POWER LIMITS OF WIND POWER PLANT

(71) Applicant: VESTAS WIND SYSTEMS A/S, Aarhus N (DK)

(72) Inventors: Rubin Panni, Aarhus C (DK); Kouroush Nayebi, Ikast (DK); Jesurathinam Arockia Arun Prasad, Trichy (IN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/257,580

(22) PCT Filed: Dec. 6, 2021

(86) PCT No.: PCT/DK2021/050353
§ 371 (c)(1),
(2) Date: Jun. 14, 2023

(87) PCT Pub. No.: WO2022/128028
PCT Pub. Date: Jun. 23, 2022

(65) Prior Publication Data
US 2024/0035443 A1 Feb. 1, 2024

(30) Foreign Application Priority Data
Dec. 18, 2020 (IN) .............. 202011055100

(51) Int. Cl.
*F03D 7/02* (2006.01)
*H02J 3/18* (2006.01)
*H02J 3/38* (2006.01)

(52) U.S. Cl.
CPC ............. *F03D 7/0284* (2013.01); *H02J 3/18* (2013.01); *H02J 3/381* (2013.01); *F05B 2270/1033* (2013.01); *H02J 2300/28* (2020.01)

(58) Field of Classification Search
CPC .. F03D 7/0284; F03D 7/02; H02J 3/18; H02J 3/38; H02J 3/381; H02J 2300/28
See application file for complete search history.

(56) References Cited

U.S. PATENT DOCUMENTS

2010/0025994 A1    2/2010    Cardinal et al.

FOREIGN PATENT DOCUMENTS

| EP | 2017936 A1 | 1/2009 |
| WO | 2011104273 A2 | 9/2011 |
| WO | 2014040600 A2 | 3/2014 |

OTHER PUBLICATIONS

PCT, Notification of Transmittal of The International Search Report and The Written Opinion of The International Searching Authority, or The Declaration for Application PCT/DK2021/050353 dated Mar. 7, 2022.

*Primary Examiner* — Robert L Deberadinis
(74) *Attorney, Agent, or Firm* — Patterson + Sheridan, LLP

(57) ABSTRACT

The disclosure relates to a method of operating a wind power plant, and related power plant controller and wind power plant. The method comprises determining a first active power at a first operating point and applying a first limit value for a reactive power limit. The method further comprises determining a second active power at a second operating point. The method further comprises, responsive to determining that the second active power meets one or more active power conditions referenced to the first active power, applying a second limit value for the reactive power limit. Applying the second limit value comprises limiting a ramp rate of the reactive power limit. The method further comprises generating control signals for one or more wind turbines to control a collective reactive power output of the wind power plant in accordance with the reactive power limit.

15 Claims, 8 Drawing Sheets

DYNAMIC CONTROL OF REACTIVE POWER LIMITS OF WIND POWER PLANT

FIELD

The present disclosure relates to controlling power production of a wind power plant connected to an electrical grid, and more specifically, to dynamically controlling reactive power limits of the wind power plant.

BACKGROUND

With increasing prevalence of wind power generation, the requirements for the connection of wind power plants (WPP) to the electrical grid are defined by new and developing grid connection codes. Although grid connection requirements can vary in different parts of the world, they typically share common goals such as permitting the development, maintenance, and operation of a coordinated, reliable, and economical transmission or distribution system. Wind power plants may differ from other types of power generation sources, having distinct aspects of control and/or layout.

The increasing prevalence of wind power generation has prompted a more efficient utilization of the features present in wind turbine generators (WTGs). Dynamically controlling reactive power limits may be important to meet various aspects of the grid connection codes (e.g., providing grid voltage support) while ensuring that operational limitations of the WTGs (e.g., current limits based on the capabilities of power converters of the WTGs) are also met.

SUMMARY

According to one aspect described herein, a method is disclosed for operating a wind power plant connected to an electrical grid. The method comprises determining a first active power at a first operating point of the wind power plant, and applying, according to the first active power, a first limit value for a reactive power limit for the wind power plant. The method further comprises determining a second active power at a second operating point of the wind power plant. The method further comprises, responsive to determining that the second active power meets one or more active power conditions referenced to the first active power, applying a second limit value for the reactive power limit. Applying the second limit value comprises limiting a ramp rate of the reactive power limit between the first limit value and the second limit value. The method further comprises generating control signals for one or more wind turbines of the wind power plant to control a collective reactive power output of the wind power plant in accordance with the reactive power limit.

Beneficially, using the method enables the wind power plant to meet grid connection codes while dynamically responding to current conditions of the grid and/or the wind power plant. By doing so, the wind power plant may be able to provide greater and/or more stable amounts of reactive power as grid voltage support, while ensuring that the operational limitations of the wind turbine generators of the wind power plant are also met.

According to another aspect described herein, a power plant controller is disclosed for a wind power plant connected to an electrical grid. The power plant controller comprises one or more computer processors configured to determine a first active power at a first operating point of the wind power plant, and apply, according to the first active power, a first limit value for a reactive power limit for the wind power plant. The one or more computer processors are further configured to determine a second active power at a second operating point of the wind power plant. Responsive to determining that the second active power meets one or more active power conditions referenced to the first active power, the one or more computer processors apply a second limit value for the reactive power limit. Applying the second limit value comprises limiting a ramp rate of the reactive power limit between the first limit value and the second limit value. The one or more computer processors are further configured to generate control signals for one or more wind turbines of the wind power plant to control a collective reactive power output of the wind power plant in accordance with the reactive power limit.

Beneficially, the power plant controller enables the wind power plant to meet grid connection codes while dynamically responding to current conditions of the grid and/or the wind power plant. By doing so, the wind power plant may be able to provide greater and/or more stable amounts of reactive power as grid voltage support, while ensuring that the operational limitations of the wind turbine generators of the wind power plant are also met.

According to another aspect described herein, a wind power plant is disclosed comprising a plurality of wind turbines, and the power plant controller described above.

To facilitate understanding, identical reference numerals have been used, where possible, to designate identical elements that are common to the figures. It is contemplated that elements disclosed in one embodiment may be beneficially utilized on other embodiments without specific recitation.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of the disclosure and are therefore not to be considered limiting of its scope, for the disclosure may admit to other equally effective embodiments.

DETAILED DESCRIPTION

Aspects described herein include a method for operating a wind power plant connected to an electrical grid. The method comprises determining a first active power at a first operating point of the wind power plant, and applying, according to the first active power, a first limit value for a reactive power limit for the wind power plant. The method further comprises determining a second active power at a second operating point of the wind power plant. The method further comprises, responsive to determining that the second active power meets one or more active power conditions referenced to the first active power, applying a second limit value for the reactive power limit. Applying the second limit value comprises limiting a ramp rate of the reactive power limit between the first limit value and the second limit value. The method further comprises generating control signals for one or more wind turbines of the wind power plant to control a collective reactive power output of the wind power plant in accordance with the reactive power limit.

Beneficially, using the method enables the wind power plant to meet grid connection codes while dynamically responding to current conditions of the grid and/or the wind power plant. By doing so, the wind power plant may be able to provide greater and/or more stable amounts of reactive power as grid voltage support, while ensuring that the operational limitations of the wind turbine generators of the wind power plant are also met (e.g., current limits based on the capabilities of power converters of the wind turbine generators).

Figure 1:
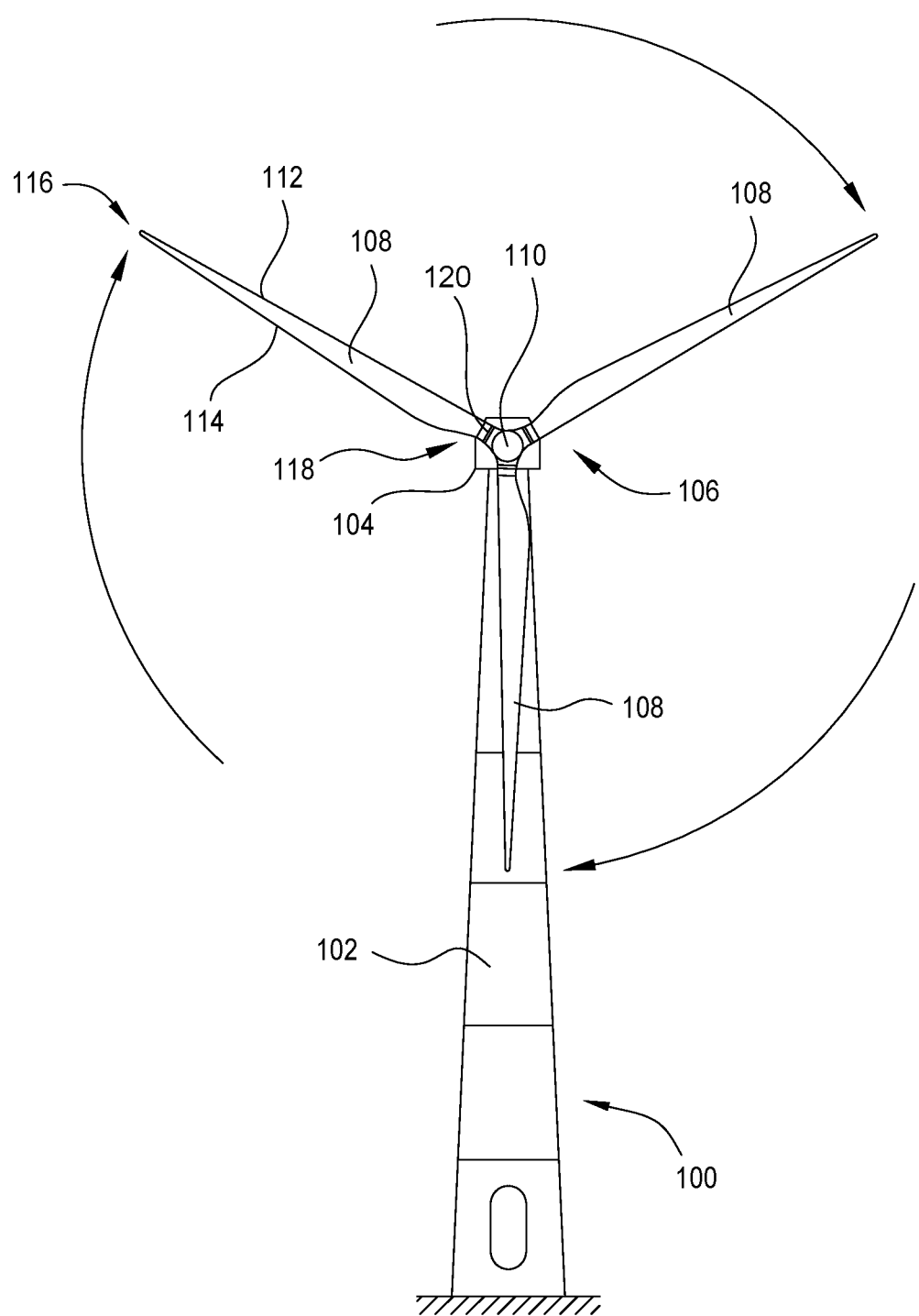
FIG. 1 illustrates a wind turbine generator according to one or more embodiments.

FIG. 1 illustrates a wind turbine generator 100 according to one or more embodiments. More specifically, FIG. 1 illustrates a diagrammatic view of a horizontal-axis wind turbine generator (WTG) 100. The wind turbine generator 100 typically includes a tower 102 and a nacelle 104 located at the top of the tower 102. A rotor 106 may be connected with the nacelle 104 through a low speed shaft extending out of the nacelle 104. As shown, the rotor 106 includes three rotor blades 108 mounted on a common hub 110, but may include any suitable number of blades, such as one, two, four, five, or more blades. The blade 108 (or airfoil) typically has an aerodynamic shape with a leading edge 112 for facing into the wind, a trailing edge 114 at the opposite end of a chord for the blade 108, a tip 116, and a root 118 for attaching to the hub 110 in any suitable manner. For some embodiments, the blades 108 may be connected to the hub 110 using pitch bearings 120 such that each blade 108 may be rotated around its longitudinal axis to adjust the pitch of the blade 108.

Figure 2:
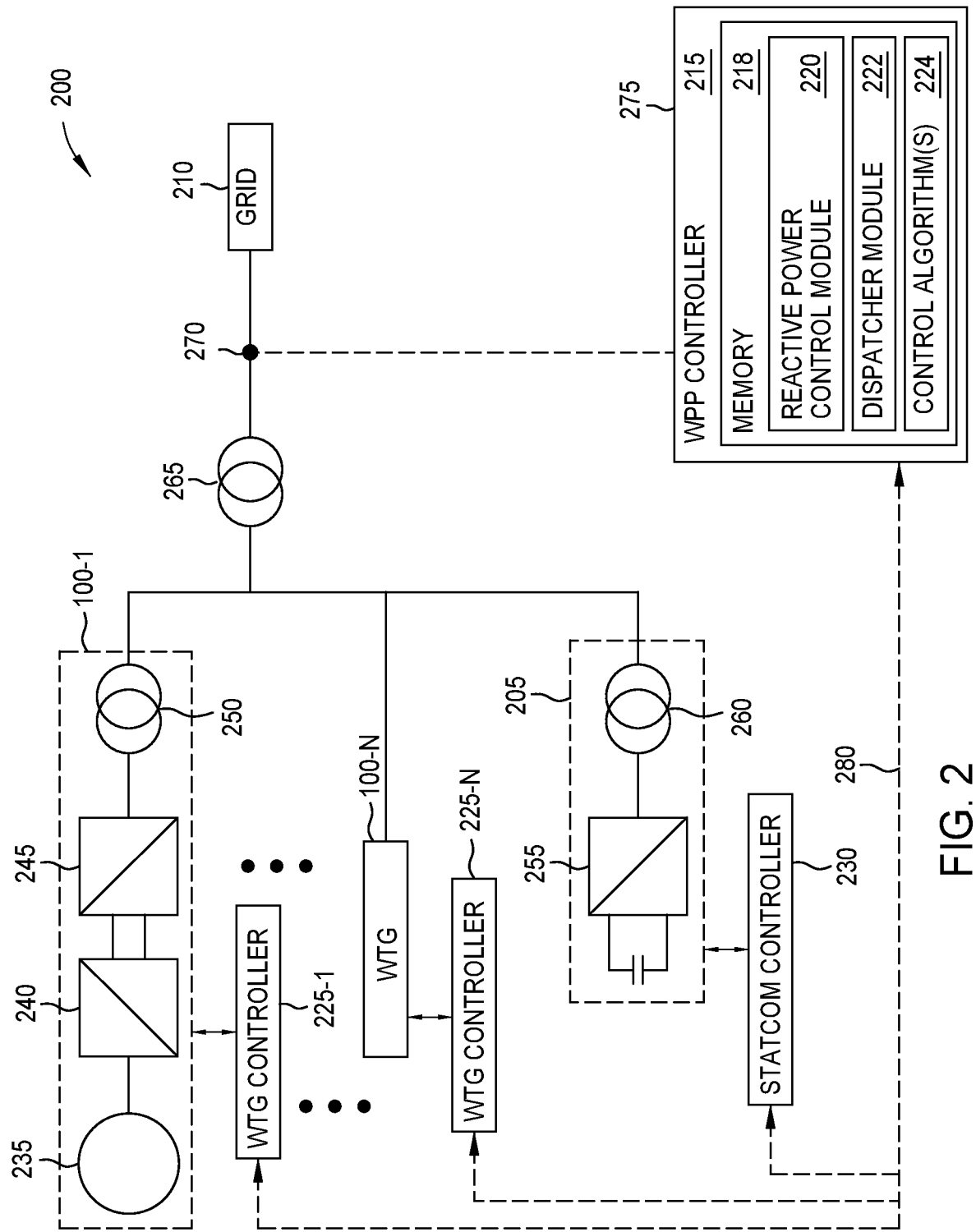
FIG. 2 is a diagram of a wind power plant, according to one or more embodiments.

FIG. 2 is a diagram of a wind power plant 200, according to one or more embodiments. The features illustrated in FIG. 2 may be used in conjunction with other embodiments. For example, the wind power plant 200 may include a plurality of wind turbine generators 100 as shown in FIG. 1.

The wind power plant 200 comprises a plurality of WTGs 100-1, . . . , 100-N that are connected through a point of common coupling (PCC) 270 to an electrical grid 210. Each of the WTGs 100-1, . . . , 100-N represents one example of the WTG 100 of FIG. 1. The WTG 100-1 comprises a generator 235 that is mechanically coupled to a rotor 106 of the WTG 100-1, and a converter that converts the electrical energy generated by the generator 235 for delivery to the electrical grid 210. As shown, the converter comprises a generator-side converter (or rectifier) 240 that converts the alternating current (AC) power generated by the generator 235 to direct current (DC) power, and a grid-side converter (or inverter) 245 that converts the DC power to AC power having a desired frequency (e.g., about 50 or 60 Hz). In some embodiments, a transformer 250 increases a voltage of the AC power provided by the grid-side converter 245 at the output of the WTG 100-1. In some embodiments, another transformer 265 receives the outputs of the WTGs 100-1, . . . , 100-N and increases the voltage of the power delivered to the grid 210 at the PCC 270.

In some embodiments, the wind power plant 200 comprises a reactive power source 205 that is capable of injecting reactive power to the grid 210. In some embodiments, the reactive power source 205 is a static synchronous compensator (STATCOM) 255. Other types of the reactive power source 205 are also contemplated, which may be capacitive and/or inductive power sources. In some embodiments, the reactive power source 205 further comprises a transformer 260 that increases a voltage of the AC power provided by the STATCOM 255. In some embodiments, the output of the reactive power source 205 is provided to the transformer 265.

The operation of each of the WTGs 100-1, . . . , 100-N is controlled using a respective WTG controller 225-1, . . . , 225-N, and the operation of the STATCOM 255 is controlled using a STATCOM controller 230. In some embodiments, a WPP controller (or PPC) 215 receives a set point 275 (e.g., from a grid system operator) and provides set points to the WTG controllers 225-1, . . . , 225-N and the STATCOM controller 230 via a network 280, and the WTG controllers 225-1, . . . , 225-N and the STATCOM controller 230 control the output of the respective WTG 100-1, . . . , 100-N and STATCOM 255 in accordance with the set points. The set points may be provided in any suitable form, such as active power, reactive power, power factor, active current, reactive current, voltage, and so forth.

In some embodiments, the wind power plant 200 is a hybrid plant comprising one or more WTGs 100 and one or more other types of generators for delivering power to the grid 210. Some non-limiting examples include a photovoltaic (PV) system, a battery energy storage system (BESS), and so forth. In some embodiments, the WPP controller 215 provides set points (or other control signals) to the other types of generators to provide active power and/or reactive power in conjunction with the embodiments discussed herein.

The network 280 represents one or more networks of any suitable types, such as the Internet, a local area network (LAN), a wide area network (WAN), and/or a wireless network. Each of the communicative links of the network 280 may have any suitable implementation, such as copper transmission cable(s), optical transmission fiber(s), wireless transmission, router(s), firewall(s), switch(es), gateway computer(s), and/or edge server(s).

In some embodiments, the WTG controllers 225-1, . . . , 225-N are configured to operate pitch actuators to adjust the pitch of the blades of the WTGs 100-1, . . . , 100-N to control the output of the respective WTG 100-1, . . . , 100-N. In some embodiments, the WTG controllers 225-1, . . . , 225-N are configured to control switching of the generator-side converter 240 and/or the grid-side converter 245 to control the output of the respective WTG 100-1, . . . , 100-N. Combinations of the blade pitch control and the converter control are also contemplated, as well as control of other components of the WTG 100-1, . . . , 100-N (e.g., variable implementations of the transformers 250, 260, electrical components connected to a DC link between the generator-side converter 240 and the grid-side converter 245, and so forth).

The WPP controller 215 comprises one or more computer processors 216 and a memory 218. The one or more computer processors 216 may be implemented in any suitable form, such as a general purpose microprocessor, a controller, an application-specific integrated circuit (ASIC), and so forth. The memory 218 may include a variety of computer-readable media selected for their size, relative performance, or other capabilities: volatile and/or non-volatile media, removable and/or non-removable media, etc.

The memory 218 may include one or more modules for performing various functions described herein. In one embodiment, each module includes program code that is executable by the one or more computer processors 216. In another embodiment, each module is partially or fully implemented in hardware (i.e., circuitry) or firmware of the WPP controller 215 (e.g., as circuitry within the one or more computer processors 216). However, other embodiments of the WPP 200 may include modules that are partially or fully implemented in other hardware or firmware, such as hardware or firmware included in one or more other computing devices connected with the WPP controller 215, and so forth. Stated another way, the overall functionality of the one or more modules may be distributed among other devices of the WPP 200.

As shown, the memory 218 comprises a reactive power control module 220, a dispatcher module 222, and one or more control algorithms 224. In some embodiments, the reactive power control module 220 is configured to determine, according to a selected one of the one or more control algorithms 224, an amount of reactive power to be provided by the WPP 200 to fulfill the set point 275. As will be discussed in greater detail, the reactive power control module 220 may apply one or more reactive power limits when determining the amount of reactive power to be provided by WPP 200, which in some embodiments are dynamically controlled to, e.g., meet grid connection code requirements while meeting operational limitations of the WTGs 100-1, . . . , 100-N.

Some non-limiting examples of the one or more control algorithms 224 include a voltage control algorithm, a power factor control algorithm, and a reactive power control algorithm. In some embodiments, the reactive power control module 220 determines the amount of reactive power based on measurements acquired at the output of the WPP 200, e.g., using one or more sensors arranged at the PCC 270.

For example, according to a voltage control algorithm, an increase in reactive power tends to increase a voltage level at the output of the WPP 200, and vice versa. Thus, where the output of the WPP 200 has a higher voltage than the corresponding set point, the reactive power production of the WPP 200 may be decreased to decrease the voltage.

In another example, according to a power factor control algorithm, the reactive power production of the WPP 200 is controlled according to active power production of the WPP 200. In some cases, the WPP 200 is controlled according to the power factor control algorithm while operating in a steady-state operational mode.

In another example, according to a reactive power control algorithm, the amount of reactive power is controlled independent of the active power production of the WPP 200.

The active power production from each of the WTGs 100-1, . . . , 100-N depends largely on the actual wind conditions at the WPP 200. In some embodiments, the WTGs 100-1, . . . , 100-N do not produce active power when the wind speed is low or near zero, but may continue to produce reactive power under these circumstances. For example, the grid-side converters 245 of the WTGs 100-1, . . . , 100-N may continue to be operated to supply reactive power to the grid 210, such that the WPP 200 has a net negative active power (i.e., drawing active power from the grid 210).

Operation of the WTGs 100-1, . . . , 100-N will result in mechanical and/or electrical losses, such as friction, electrical resistance, magnetic losses in the generator 235, and semiconductor losses. Further, active power is needed to operate auxiliary equipment of the WTGs 100-1, . . . , 100-N, such as hydraulic pumps for pitch actuators, cooling fans, yaw motors, deicing equipment, and so forth. Still further, active power may be needed to charge energy storage device(s) of the WPP 200, even though some or all of the active power may be drawn from the grid 210.

Thus, a situation may arise where a net negative active power may be provided by the WPP 200, even where the wind speed is non-zero and the rotors of the WTGs 100-1, . . . , 100-N are rotating. This operational mode may still be beneficial, as generating the reactive power to provide voltage support to the grid 210 may offset the costs of the active power drawn by the WPP 200.

Figure 3:
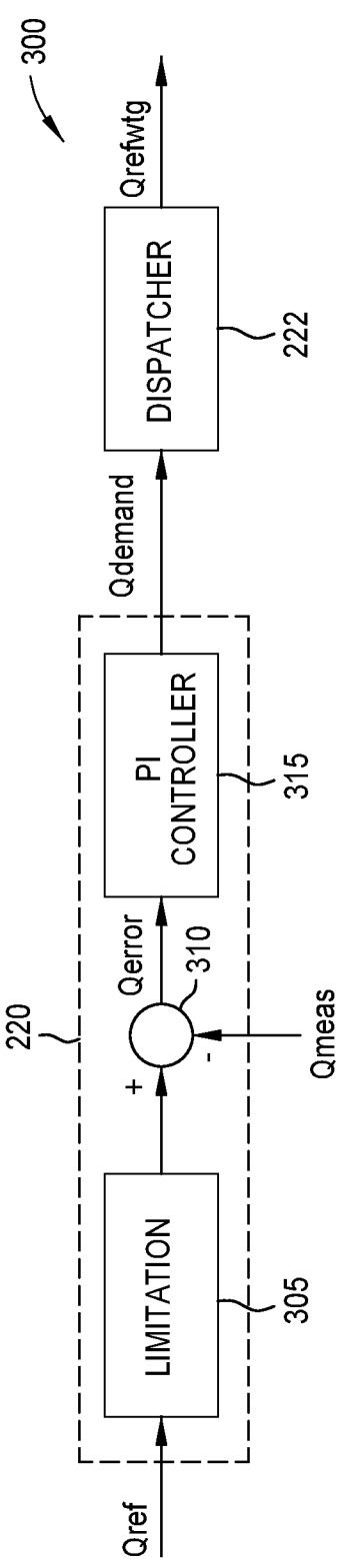
FIG. 3 illustrates operation of a power plant controller, according to one or more embodiments.

FIG. 3 illustrates operation of a power plant controller, according to one or more embodiments. The features illustrated in diagram 300 may be used in conjunction with other embodiments. For example, the diagram 300 represents one example implementation of the WPP controller 215 of FIG. 2.

In the diagram 300, the reactive power control module 220 receives a reactive power reference Qref (one example of the set point 275 of FIG. 2) at a limitation module 305. In some embodiments, the limitation module 305 compares the reactive power reference Qref with one or more reactive power limits. When the reactive power reference Qref exceeds a reactive power limit (e.g., greater than a maximum or lesser than a minimum), the limitation module 305 limits the reactive power reference Qref.

Figure 4:
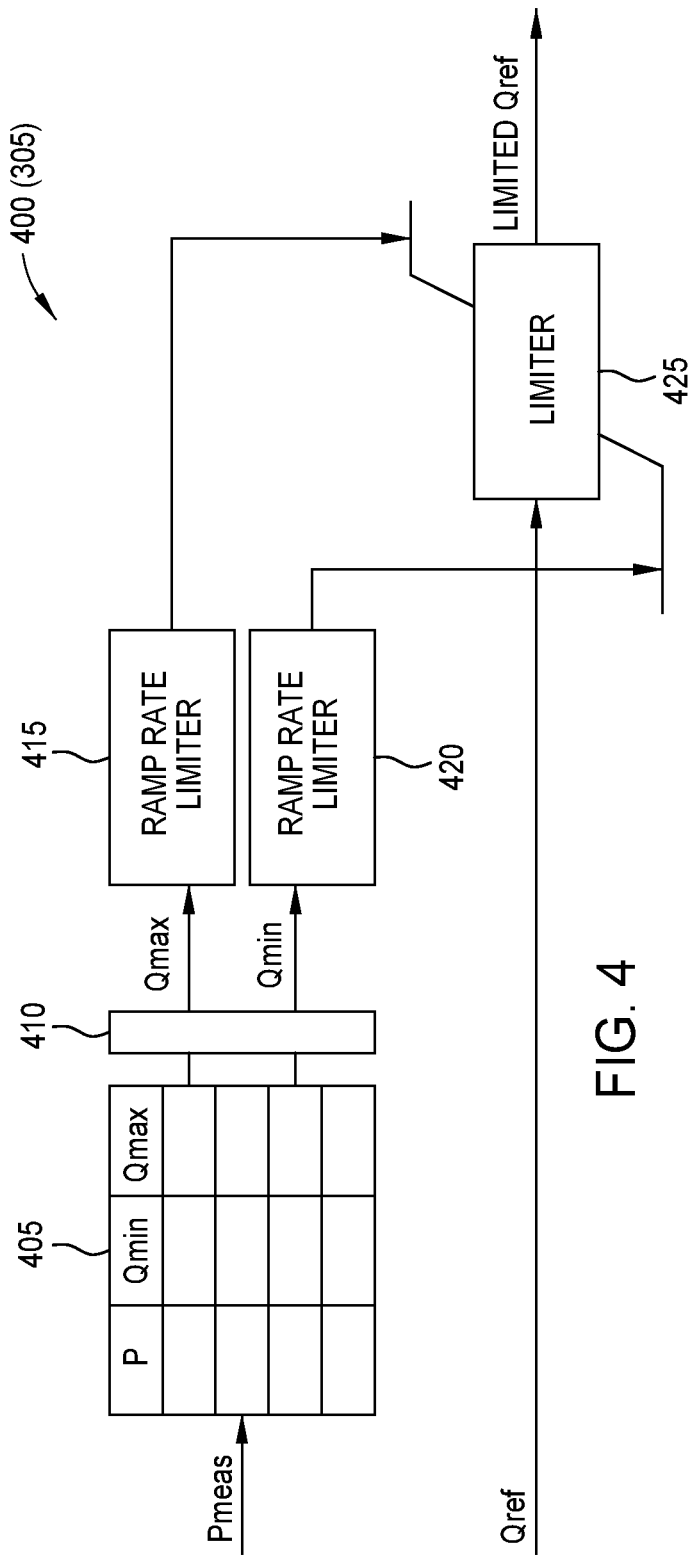
FIG. 4 illustrates operation of a limitation module of a power plant controller, according to one or more embodiments.

One exemplary implementation of the limitation module 305 is illustrated in diagram 400 of FIG. 4. In the diagram 400, an active power is determined (Pmeas) and referenced to a table 405 (which is one example of a reactive power limit function that defines a plurality of limit values for the reactive power limit, where the plurality of limit values correspond to a plurality of active power values for a plurality of operating points). In some embodiments, the table 405 stores one or more reactive power limits for a plurality of active power values. For example, the table 405 may store a maximum reactive power limit (Qmax) and a minimum reactive power limit (Qmin) that define limit values for a plurality of operating points. As used herein, an "operating point" refers to one or more settings of the WPP during operation. In some embodiments, the operating point comprises at least an active power value, which may reflect active power generation and/or active power consumption of the WPP. In some embodiments, the operating point further comprises a reactive power value. In some embodiments, the operating point further comprises other operational parameters and/or environmental parameters.

In some embodiments, one or more of the operating points correspond to a negative active power of the wind power plant. In some embodiments, the table 405 may implement a unity power factor limitation by including relatively small values of Qmin and Qmax (e.g., both near zero).

Table 405 may be implemented as a plurality of limit values corresponding to discrete operating points of the wind power plant. In some embodiments, the table 405 may be supplied by a grid system operator or an operator of the wind power plant.

Thus, during operation a first active power is determined at a first operating point of the wind power plant, and a first limit value is applied for a reactive power limit. When a second active power is determined at a second operating point, a second limit value for the reactive power limit may be applied if the second active power meets one or more active power conditions referenced to the first active power. The one or more active power conditions may include: (i) the second active power differs from the first active power by at least a threshold amount (e.g., a hysteresis value), and/or (ii) the second active power differs from the first active power, for at least a predefined period, in a direction of increase or decrease from the first active power to the second active power. Other active power conditions are also contemplated. Further, different active power condition(s) may be applied for transitioning between different limit values.

Assuming that the one or more active power conditions have been met, the second limit values for the maximum reactive power limit (Qmax) and/or the minimum reactive power limit (Qmin) are output from the table 405. In some embodiments, the limitation module 305 further comprises an interpolation module 410 that determines the second limit value(s) by interpolating between adjacent limit values of the plurality of limit values of the table 405. For example, assuming the interpolation module 410 uses linear interpolation, a value of the active power that occurs halfway between two operating points of the table 405 will result in a value of the reactive power limit that is halfway between the limit values for the two operating points. Other interpolation functions of the interpolation module 410 are also contemplated.

The second limit value(s) output by the table 405 and/or the interpolation module 410 are transmitted to respective ramp rate limiters 415, 420. The ramp rate limiters 415, 420 determine whether ramping from the first limit values to the second limit values would exceed ramp rate limits for the reactive power limits, and further limit the second limit values when the ramp rate limits would be exceeded. The ramp rate limits for the reactive power limits may be determined based on grid connection code requirements and/or power production capabilities of the WPP. For example, the ramp rate limits may be determined based on the active power and/or reactive power production of the WPP and converter current limits of the WTGs. In some cases, the ramp rate limits of the reactive power limits may be inversely proportional to grid connection code-specified ramp rates for active power production, so that a greater amount of reactive power may be provided by the WPP without exceeding the converter current limits of the WTGs.

In some embodiments, limiting the ramp rate of the reactive power limits may allow more stable reactive power to be provided by the WPP during fluctuations in the active power. For example, even relatively small fluctuations in the active power may cause the reactive power limit to oscillate between two adjacent values of a reactive power limit. Assuming that the WPP is operating to produce reactive power near the reactive power limit, the oscillations between the two adjacent values can cause relatively large fluctuations in the reactive power, which tends to decrease the stability of the power provided by the WPP and in some cases may be incompatible with grid connection codes. Thus, limiting the ramp rate of the reactive power limits may allow more stable power production by the WPP. The second limit values, whether modified by the ramp rate limiters 415, 420 or not, are transmitted to a limiter module 425 that limits the range of the reactive power reference Qref.

Returning to FIG. 3, the limited reactive power reference Qref is compared with a reactive power measurement Qmeas (e.g., at the PCC of the WPP 200) at a subtractor 310. The difference Qerror is output from the subtractor 310 to a proportional-integral (PI) controller 315 to generate a reactive power demand Qdemand for the WPP 200. The PI controller 315 may have an alternate implementation, such as a proportional (P) controller, a proportional-integral-derivative (PID) controller, and so forth.

A dispatcher 222 receives the reactive power demand Qdemand and generates set points Qrefwtg for the WTG(s) and/or for the reactive power source(s) of the WPP 200. In some embodiments, the dispatcher 222 may divide the reactive power demand Qdemand equally among each of the WTG(s) and the reactive power source(s). In other embodiments, the dispatcher 222 may distribute the reactive power demand Qdemand differently for the WTG(s) and the reactive power source(s). For example, the dispatcher 222 may prioritize fulfillment of the reactive power demand Qdemand by the WTG(s) or by the reactive power source(s), may prioritize fulfillment of the reactive power demand Qdemand by the power generation capabilities of the WTG(s) (e.g., the particular wind conditions), and so forth.

Figure 5:
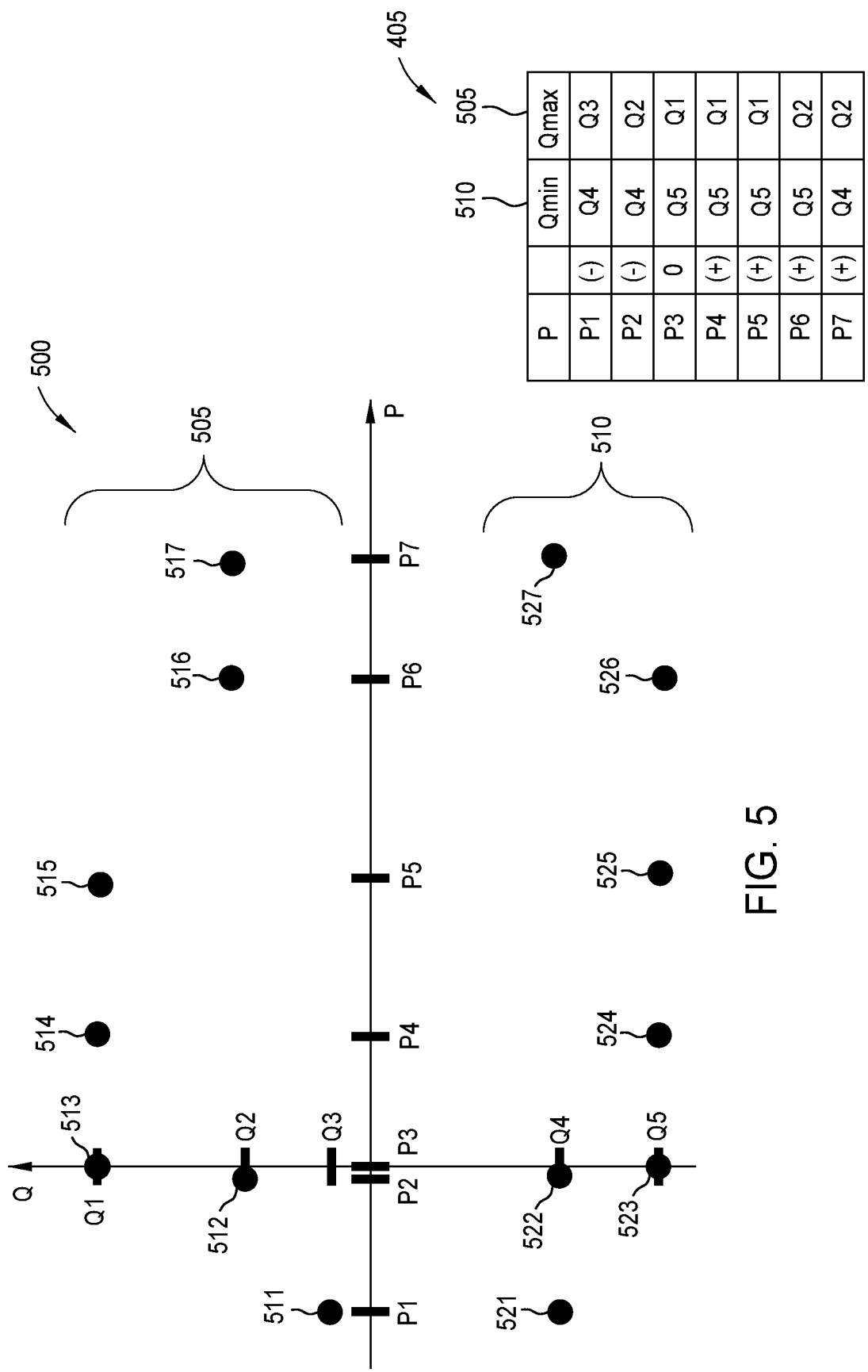
FIG. 5 illustrates reactive power limits for a wind power plant, according to one or more embodiments.

FIG. 5 illustrates reactive power limits for a wind power plant, according to one or more embodiments. The features illustrated in diagram 500 may be used in conjunction with other embodiments. For example, the diagram 500 represents one example implementation of the table 405 of FIG. 4.

The table 405 includes limit values 511, 512, 513 . . . , 517 for a first reactive power limit 505 (Qmax), and limit values 521, 522, 523, . . . , 527 for a second reactive power limit 510 (Qmin). The limit values 511-517, 521-527 each correspond to an active power level P1, P2, . . . , P7 for different operating points of the WPP. As shown, the table 405 includes limit values for the first reactive power limit 505 and the second reactive power limit 510 at each of the active power levels P1, P2, . . . , P7. However, in other implementations the limit values for the first reactive power limit 505 and the second reactive power limit 510 may be defined relative to different active power levels, the first reactive power limit 505 and the second reactive power limit 510 may not have limit values defined at each of the active power levels P1, P2, . . . , P7, and so forth.

The limit values 511-517, 521-527 will now be discussed for an increasing sequence for the active power levels P1, P2, . . . , P7. The limit values Q1, Q2, . . . , Q5 are presented in a decreasing sequence. At a first operating point of the WPP, the active power level P1 is a negative active power (−), Qmin=Q4, and Qmax=Q3. At a second operating point, the active power level P2 of the WPP is a negative active power (−), Qmin=Q4, and Qmax=Q2. At a third operating point, the active power level P3 of the WPP is zero (0), Qmin=Q5, and Qmax=Q1. At a fourth operating point, the active power level P4 of the WPP is a positive active power (+), Qmin=Q5, and Qmax=Q1. At a fifth operating point, active power level P5 of the WPP is a positive active power (+), Qmin=Q5, and Qmax=Q1. At a sixth operating point, the active power level P6 of the WPP is a positive active power (+), Qmin=Q5, and Qmax=Q2. At a seventh operating point, the active power level P7 of the WPP is a positive active power (+), Qmin=Q4, and Qmax=Q2.

Figure 6:
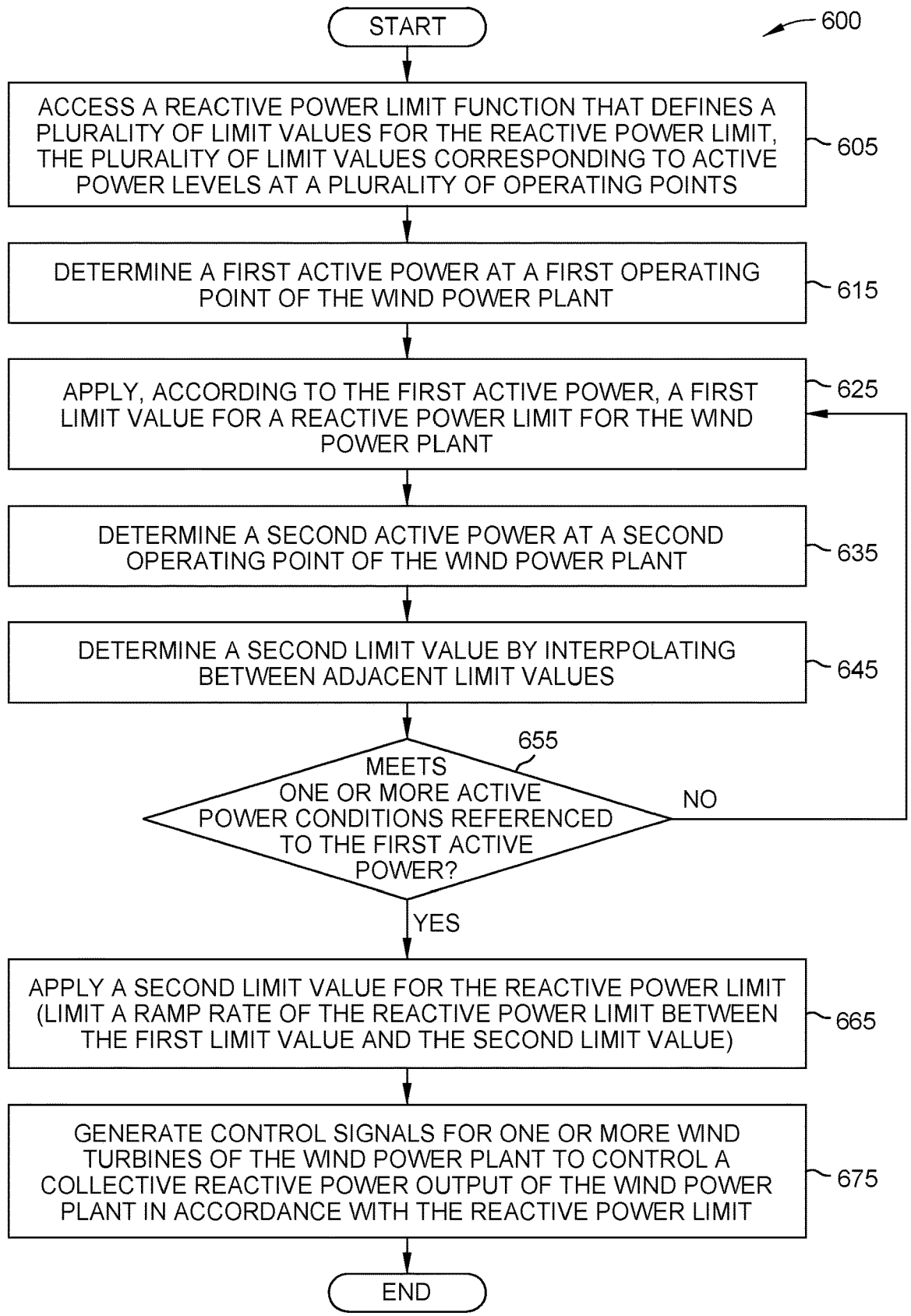
FIG. 6 is a method of operating a wind power plant connected to an electrical grid, according to one or more embodiments.

FIG. 6 is a method 600 of operating a wind power plant connected to an electrical grid, according to one or more embodiments. The features illustrated in FIG. 6 may be used in conjunction with other embodiments. For example, the method 600 may be performed by the WPP controller 215 of FIG. 2.

The method 600 begins at block 605, where the WPP controller accesses a reactive power limit function that defines a plurality of limit values for the reactive power limit. The plurality of limit values correspond to active power levels at a plurality of operating points. In some embodiments, the reactive power limit function defines a maximum reactive power limit and/or a minimum reactive power limit. In some embodiments, the reactive power limit function is stored as a table having discrete limit value(s) for different active power levels.

At block 615, the WPP controller determines a first active power at a first operating point of the WPP. In some embodiments, the WPP controller determines the first active power by acquiring an active power measurement at a point of common coupling with an electrical grid. At block 625, the WPP controller applies, according to the first active power, a first limit value for a reactive power limit for the WPP.

At block 635, the WPP controller determines a second active power at a second operating point of the WPP. In some embodiments, the WPP controller determines the second active power by acquiring a subsequent active power measurement. The WPP controller determines, according to the second active power, a second limit value for the reactive power limit. In some embodiments, the WPP controller accesses the reactive power limit function (e.g., a table) to determine the second limit value. In some embodiments (at block 645) the WPP controller determines the second limit value by interpolating between adjacent limit values.

At block 655, the WPP controller determines whether the second active power meets one or more active power conditions referenced to the first active power.

In some embodiments, the one or more active power conditions comprise the second active power differs from the first active power by at least a threshold amount. In some embodiments, the one or more active power conditions comprise the second active power differs from the first active power, for at least a predefined period, in a direction of increase or decrease from the first active power to the second active power.

If the second active power does not meet the one or more active power conditions ("NO"), the method 600 returns to block 625. If the second active power meets the one or more active power conditions ("YES"), the method 600 proceeds to block 665, where the WPP controller applies the second limit value for the reactive power limit. In some embodiments, applying the second limit value comprises limiting a ramp rate of the reactive power limit between the first limit value and the second limit value. In some alternate embodiments, the determination of block 655 is performed before determining the second limit value (e.g., prior to block 645).

At block 675, the WPP controller generates control signals for one or more wind turbines of the WPP to control a collective reactive power output of the WPP in accordance with the reactive power limit. The method 600 ends following completion of block 675.

Figure 7:
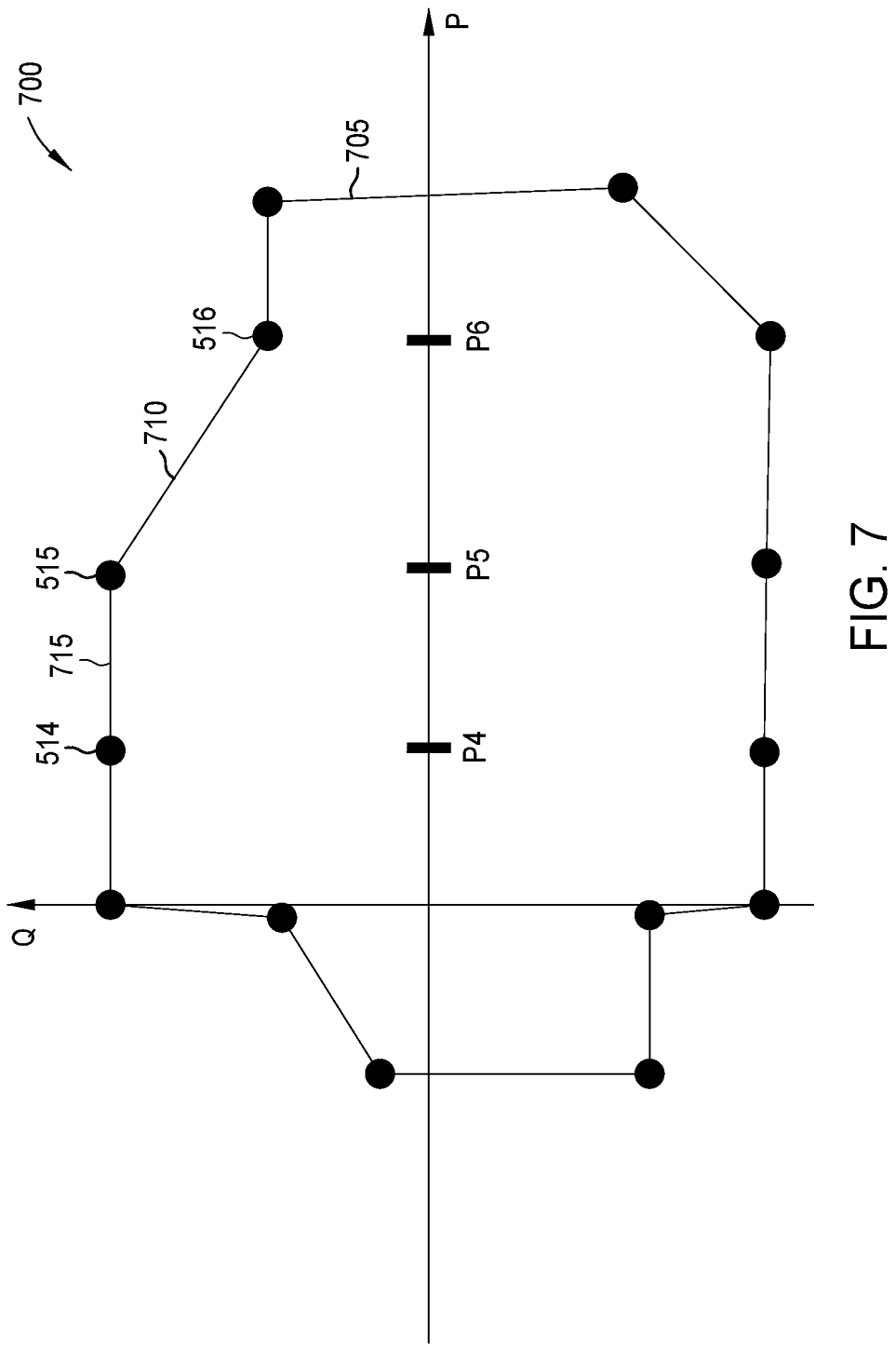
FIG. 7 illustrates interpolating between adjacent limit values of reactive power limits, according to one or more embodiments.

FIG. 7 illustrates interpolating between adjacent limit values of reactive power limits, according to one or more embodiments. The features illustrated in diagram 700 may be used in conjunction with other embodiments. For example, the diagram 700 may represent the operation of the interpolation module 410 of FIG. 4 using the limit values of the first reactive power limit 505 and the second reactive power limit 510 of FIG. 5.

A plot 705 connects adjacent limit values of the first reactive power limit 505 and the second reactive power limit 510. The plot 705 includes one or more interpolated segments, such as segment 710 connecting the limit values 515, 516, and segment 715 connecting the limit values 514, 515. For an active power level of an operating point falling between the active power levels P5, P6, a limit value is selected according to the segment 710. For an active power level of an operating point falling between the active power levels P4, P5, a limit value is selected according to the segment 715. Notably, because the limit values 514, 515 are the same, the limit values selected according to the segment 715 may also be the same. Further, while linear interpolation is shown, other interpolation functions are also contemplated.

Figure 8:
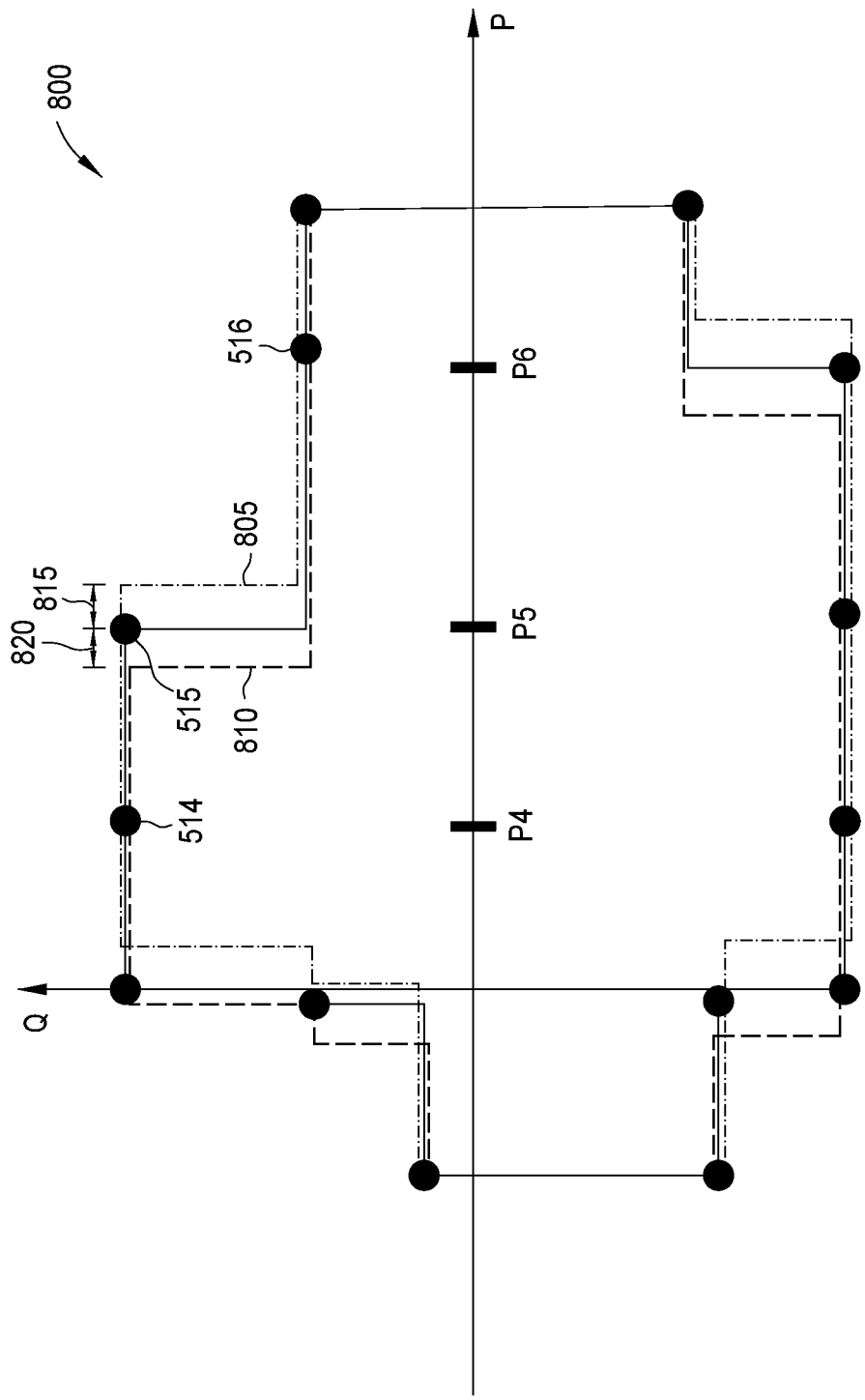
FIG. 8 illustrates applying hysteresis between limit values of reactive power limits, according to one or more embodiments.

FIG. 8 illustrates applying hysteresis between limit values of reactive power limits, according to one or more embodiments. The features illustrated in diagram 800 may be used in conjunction with other embodiments. For example, the diagram 800 may represent the operation of the WPP controller 200 using the limit values of the first reactive power limit 505 and the second reactive power limit 510 of FIG. 5.

In the diagram 800, transitions between adjacent limit values in a direction of increase in active power are controlled according to a first plot 805, and transitions between adjacent limit values in a direction of decrease in active power are controlled according to a second plot 810.

Transitions between the limit values 515, 516 will now be described as an example. Assume that the WPP is operating at an operating point corresponding to the active power level P5. At a new operating point having an increase in active power from the active power level P5, the limit value 515 remains selected when the active power is less than a sum of the active power level P5 and a first threshold amount 815 (reflected in the first plot 805). The limit value 516 is selected when the active power is greater than a sum of the active power level P5 and the first threshold amount 815.

Next, assume that the WPP is operating at an operating point corresponding to the active power level P6. At a new operating point having a decrease in active power from the active power level P6, the limit value 516 remains selected when the active power is greater than the active power level P5, minus a second threshold amount 820 (reflected in the second plot 810). The limit value 515 is selected when the active power is less than the active power level P5, minus the second threshold amount 820.

Thus, when applying a second (new) limit value for the reactive power limit, the second (new) active power may be evaluated according to one or more active power conditions referenced to the first (previous) active power. As shown in FIG. 8, the one or more active power conditions comprise the second active power differs from the first active power by at least a threshold amount.

In another embodiment, the one or more active power conditions comprises the second active power differs from the first active power, for at least a predefined period, in a direction of increase or decrease from the first active power to the second active power. For example, at a new operating point having an increase in active power from the active power level P5, the limit value 516 may be selected when the active power is greater than the active power level P5 for at least the predefined period. The predefined period may be defined in any suitable terms—time, a number of active power measurements, and so forth.

Further, use of the predefined period may be independent from, or in conjunction with, the second active power differing from the first active power by at least a threshold amount. For example, using the diagram 800 as an example, at a new operating point having an increase in active power from the active power level P5, the limit value 516 would be selected when the active power is greater than a sum of the active power level P5 and the first threshold amount 815 for at least the predefined period.

Still further, different functions (or different active power conditions) may be applied by the WPP controller between different pairs of adjacent limit values. For example, a first pair of adjacent limit values may be subject to the threshold amount(s) (which may include a direction of increase or decrease), while another pair of adjacent limit values may be interpolated, while yet another pair of adjacent limit values has a timer applied (e.g., determining whether the predefined period is met). Further, some or all pairs of adjacent limit values need not have any functions applied.

Figure 9:
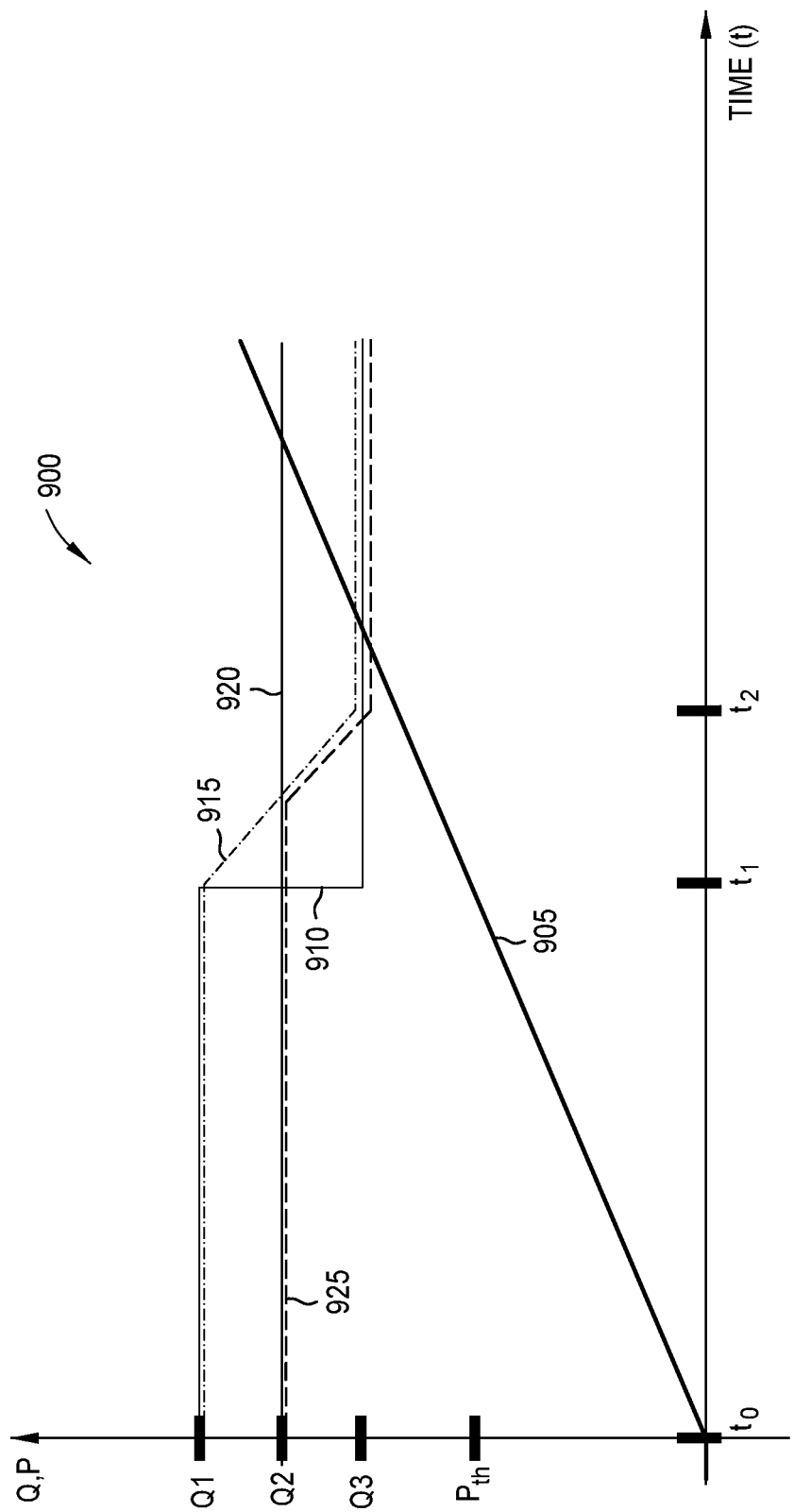
FIG. 9 illustrates limiting a ramp rate of a reactive power limit, according to one or more embodiments.

FIG. 9 illustrates limiting a ramp rate of a reactive power limit, according to one or more embodiments. The features in diagram 900 may be used in conjunction with other embodiments. For example, the diagram 900 may represent example operation of the ramp rate limiter 415 of FIG. 4.

A reactive power reference 920 at a reactive power level Q2 is applied to the WPP for the duration of the diagram 900. At a first time t0, an active power 905 of the WPP increases from an initial value. A reactive power limit 910 and a reactive power limit 915 are at an initial limit value (that is, a reactive power level Q1 that is greater than the reactive power level Q2). The reactive power limit 910 is not subject to a ramp rate limit, while the reactive power limit 915 is subject to the ramp rate limit.

At a time t1, the active power 905 reaches a threshold power Rh that triggers a transition between different limit values for the reactive power limit 910, 915. The threshold power Pth may reflect meeting the one or more active power conditions that are discussed above. The reactive power limit 910 decreases substantially instantaneously from the reactive power level Q1 to a reactive power level Q3 that is less than the reactive power level Q2.

Because the reactive power limit 915 is subject to the ramp rate limit, the reactive power limit 915 begins decreasing at the time t1, reaching the reactive power level Q3 at a time t2. Although the reactive power reference 920 remains constant at the reactive power level Q2, the decrease in the reactive power limit 915 causes a corresponding decrease in a reactive power measurement 925. That is, the reactive power measurement 925 decreases from the reactive power level Q2 to the reactive power level Q3 between the times t1, t2.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the FIGs. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

The invention claimed is:

1. A method of operating a wind power plant connected to an electrical grid, the method comprising:
    determining a first active power at a first operating point of the wind power plant;
    applying, according to the first active power, a first limit value for a reactive power limit for the wind power plant;
    determining a second active power at a second operating point of the wind power plant;
    responsive to determining that the second active power meets one or more active power conditions referenced to the first active power, applying a second limit value for the reactive power limit, wherein applying the second limit value comprises limiting a ramp rate of the reactive power limit between the first limit value and the second limit value; and
    generating control signals for one or more wind turbines of the wind power plant to control a collective reactive power output of the wind power plant in accordance with the reactive power limit.

2. The method of claim 1, wherein the one or more active power conditions comprise:
    the second active power differs from the first active power by at least a threshold amount.

3. The method of claim 1, wherein the one or more active power conditions comprise:
    the second active power differs from the first active power, for at least a predefined period, in a direction of increase or decrease from the first active power to the second active power.

4. The method of claim 1, further comprising:
    accessing a reactive power limit function that defines a plurality of limit values for the reactive power limit, the plurality of limit values corresponding to active power levels at a plurality of operating points.

5. The method of claim 4,
    wherein the reactive power limit is one of a maximum reactive power limit and a minimum reactive power limit, and
    wherein the reactive power limit function further defines, for each of the plurality of operating points, a respective limit value for the other of the maximum reactive power limit and the minimum reactive power limit.

6. The method of claim 4, further comprising:
determining the second limit value by interpolating between adjacent limit values of the plurality of limit values.

7. The method of claim 1, wherein one or both of the first active power and the second active power are a negative active power.

8. A power plant controller for a wind power plant connected to an electrical grid, the power plant controller comprising:
one or more computer processors configured to:
determine a first active power at a first operating point of the wind power plant;
apply, according to the first active power, a first limit value for a reactive power limit for the wind power plant;
determine a second active power at a second operating point of the wind power plant;
responsive to determining that the second active power meets one or more active power conditions referenced to the first active power, apply a second limit value for the reactive power limit, wherein applying the second limit value comprises limiting a ramp rate of the reactive power limit between the first limit value and the second limit value; and
generate control signals for one or more wind turbines of the wind power plant to control a collective reactive power output of the wind power plant in accordance with the reactive power limit.

9. The power plant controller of claim 8, wherein the one or more active power conditions comprise:
the second active power differs from the first active power by at least a threshold amount.

10. The power plant controller of claim 8, wherein the one or more active power conditions comprise:
the second active power differs from the first active power, for at least a predefined period, in a direction of increase or decrease from the first active power to the second active power.

11. The power plant controller of claim 8, wherein the one or more computer processors are further configured to:
access a reactive power limit function that defines a plurality of limit values for the reactive power limit, the plurality of limit values corresponding to active power levels at a plurality of operating points.

12. The power plant controller of claim 11,
wherein the reactive power limit is one of a maximum reactive power limit and a minimum reactive power limit, and
wherein the reactive power limit function further defines, for each of the plurality of operating points, a respective limit value for the other of the maximum reactive power limit and the minimum reactive power limit.

13. The power plant controller of claim 11, wherein the one or more computer processors are further configured to:
determine the second limit value by interpolating between adjacent limit values of the plurality of limit values.

14. The power plant controller of claim 8, wherein one or both of the first active power and the second active power are a negative active power.

15. A wind power plant comprising:
a plurality of wind turbines; and
the power plant controller of claim 8.

* * * * *